(12) United States Patent
Shumate (10) Patent No.: US 7,140,501 B2
(45) Date of Patent: Nov. 28, 2006

(54) HAT AND UNIFORM CADDY

(76) Inventor: Clayton Shumate, P.O. Box 548, Eddy, TX (US) 76524-0548

( * ) Notice: Subject to any disclaimer, the term of this patent is extended or adjusted under 35 U.S.C. 154(b) by 806 days.

(21) Appl. No.: 10/120,594

(22) Filed: Apr. 11, 2002

(65) Prior Publication Data

US 2003/0192841 A1   Oct. 16, 2003

(51) Int. Cl.
*A47F 7/19* (2006.01)
*A47B 43/00* (2006.01)

(52) U.S. Cl. .................... 211/85.3; 211/189
(58) Field of Classification Search ............ 211/189, 211/206, 204, 85.3, 186, 124; 312/107, 108, 312/128, 265.1, 264, 249.8, 249.1; 280/79.3; D6/315, 396; 248/129; 108/16
See application file for complete search history.

(56) References Cited

U.S. PATENT DOCUMENTS

| | | | | |
|---|---|---|---|---|
| 430,340 | A | * | 6/1890 | Eyles ...................... 211/206 |
| D179,459 | S | * | 12/1956 | Potts ......................... D34/20 |
| 2,856,253 | A | * | 10/1958 | Flynn ....................... 312/228 |
| 2,894,644 | A | * | 7/1959 | Magnuson et al. ........ 211/206 |
| 2,966,991 | A | * | 1/1961 | Duffner .................... 211/60.1 |
| 3,240,505 | A | * | 3/1966 | Schlemitzauer ............ 280/651 |
| 3,358,847 | A | * | 12/1967 | Magnuson .................. 211/189 |
| 3,941,251 | A | * | 3/1976 | Izen .......................... 211/206 |
| 4,165,088 | A | * | 8/1979 | Nelson .................... 280/47.35 |
| 4,657,317 | A | * | 4/1987 | Gemma ..................... 312/198 |
| 4,720,048 | A | * | 1/1988 | Maroney et al. ......... 280/47.34 |
| 4,754,885 | A | * | 7/1988 | Rich ........................ 211/132.1 |
| 4,948,154 | A | * | 8/1990 | Guggenheim .............. 280/79.3 |
| 4,958,738 | A | * | 9/1990 | Lee ......................... 211/106.01 |
| 4,958,841 | A | * | 9/1990 | Keen ....................... 280/47.35 |
| 5,190,305 | A | * | 3/1993 | Putman .................... 280/79.3 |
| 5,518,127 | A | * | 5/1996 | Warmack et al. .......... 211/193 |
| 5,555,640 | A | * | 9/1996 | Ou ............................ 34/202 |
| 5,628,522 | A | * | 5/1997 | Hall ........................ 280/43.17 |
| 5,713,584 | A | * | 2/1998 | Crane ...................... 280/47.35 |
| 5,865,517 | A | * | 2/1999 | Wang ....................... 312/237 |
| 5,875,869 | A | * | 3/1999 | Busuttil et al. .......... 280/43.23 |
| 6,260,865 | B1 | * | 7/2001 | Yacobi et al. ............. 280/47.34 |
| 6,364,330 | B1 | * | 4/2002 | Weber et al. ............. 280/47.35 |
| 6,401,947 | B1 | * | 6/2002 | Hu et al. .................... 211/189 |
| 6,478,169 | B1 | * | 11/2002 | Krusell ..................... 211/85.7 |
| 2002/0148799 | A1 | * | 10/2002 | Denny et al. ............. 211/186 |

FOREIGN PATENT DOCUMENTS

JP   156284   * 6/1994

* cited by examiner

*Primary Examiner*—Jennifer E. Novosad
(74) *Attorney, Agent, or Firm*—Marcus Hammack (57) ABSTRACT

A hat-and-uniform caddy that has hat space for protective hat storage and transportation in predetermined proportion to uniform space for protective uniform storage and transportation. The hat-and-uniform caddy includes swivel casters and optional center wheels for transporting hat-and-uniform caddy on and off of transportation vehicles and for placing hat-and-uniform caddy immovably on the vehicles for transportation to and from performance sites where the hats and uniforms are used. Space for hats in boxes is provided on horizontal supports with retainer walls. The space for uniforms are provided on hanger rods having notches and optional keepers. Components of the hat and uniform caddy are assembled and disassembled with wheel fasteners which join a plurality of parts simultaneously.

8 Claims, 10 Drawing Sheets

HAT AND UNIFORM CADDY

BACKGROUND OF THE INVENTION

1. Field of the Invention

This invention relates to transportable caddies for containing hats, uniforms and related items neatly for transportation either assembled with the hats, uniforms and related items on them or unassembled for separate transportation and storage.

2. Relation to Prior Art

Transporting and storing hats, uniforms and related items for bands, choirs, entertainers and various groups of performers has long been a time-consuming and often risky problem. It has been relegated to unreliable improvision by marching bands, choirs and other performers that travel to various destinations. Usually, hats, uniforms, related items and garments of performers and entertainers are transported and stored with inadequate care and with inconvenience. They are often put in or on whatever clothes container, rack, rod, shelf, luggage or box that might be available at performance destinations or at base facilities. Although there are known clothing caddies, garment-sales racks and closets for garment storage, there is no known hat-and-uniform caddy for transporting and storing hats, uniforms, related items and garments conveniently, orderly and securely in a manner taught by this invention.

Listed for consideration is related but different prior art that includes the following:

| PATENT | DATE | NAME | CLASS |
|---|---|---|---|
| U.S. Pat. No. 6,478,169 B2 | Nov. 12, 2002 | Krusell | 211/85.7 |
| U.S. Pat. No. 6,401,947 B1 | Jun. 11, 2002 | Hu et al. | 211/189 |
| U.S. Pat. No. 6,364,330 B1 | Apr. 02, 2002 | Weber et al. | 280/47.35 |
| U.S. Pat. No. 5,875,869 | Mar. 02, 1999 | Busuttil et al. | 182/69.6 |
| U.S. Pat. No. 5,865,517 | Feb. 02, 1999 | Wang | 312/237 |
| U.S. Pat. No. 5,713,584 | Feb. 03, 1998 | Crane | 280/47.35 |
| U.S. Pat. No. 4,948,154 | Aug. 14, 1990 | Guggenheim | 280/79.3 |
| U.S. Pat. No. 2,266,991 | Jan. 03, 1961 | Duffner | 211/60 |
| U.S. Des. 179,459 | Dec. 25, 1956 | Potts | D14/3 |

SUMMARY OF THE INVENTION

Objects of patentable novelty and utility taught by this invention are to provide a transportable hat-and-uniform caddy which:

can be assembled quickly and conveniently for safe storage and vehicular transportation storage of hats and uniforms for bands and other groups of performers;

can be disassembled quickly and conveniently for storage when hats and uniforms have been removed from it;

includes hat-storage space, uniform-hanger supports and optionally performance-item containers that prevent movement and damage from transportation movement and theft;

includes lockable mobility with wheels for being loaded and unloaded easily for transportation on vehicles, for being placed immovably on vehicles and for being moved easily from vehicles to use areas and to after-use storage areas;

includes containment organizers which maintain protective separation of the hats, uniforms, garments and other items when being transported;

can include cleanly protective covering; and can include lockable retainers of the hats, uniforms, garments and other items.

This invention accomplishes these and other objectives with a hat-and-uniform caddy having hat space for protective hat storage and transportation in proportion to uniform space for protective uniform storage and transportation predeterminedly. An immovably placeable mobility of the hat-and-uniform caddy includes caddy wheels for wheeling the hat-and-uniform caddy on and off of transportation vehicles and for placing the hat-and-uniform caddy immovably on the vehicles for transportation to and from performance sites where the hats and uniforms are used. Spaces for hats and uniforms can include hat-box containers for uniform hats, slide-prevention hanging rods for uniforms, protective covers and locks. Components of the hat-and-uniform caddy include quick-disconnect connections for use assembly and for non-use disassembly when hats and uniforms have been removed from it.

BRIEF DESCRIPTION OF DRAWINGS

This invention is described by appended claims in relation to description of a preferred embodiment with reference to the following drawings which are explained briefly as follows:

DESCRIPTION OF PREFERRED EMBODIMENT

Listed numerically below with reference to the drawings are terms used to describe features of this invention. These terms and numbers assigned to them designate the same features throughout this description.

| | |
|---|---|
| 1. | Hat-and-uniform caddy |
| 2. | Vertical supports |
| 3. | Horizontal girders |
| 4. | Horizontal supports |
| 5. | Hanger rod |
| 6. | Notches |
| 7. | Clothes hangers |
| 8. | Uniforms |
| 9. | Swivel keepers |
| 10. | Slide keepers |
| 11. | Retainer walls |
| 12. | Base framework |
| 13. | Swivel casters |
| 14. | End legs |
| 15. | Floor surface |
| 16. | Center wheels |
| 17. | Jack |
| 18. | Off-centered axle |
| 19. | First side |
| 20. | Second side |
| 21. | Boxes |
| 22. | First end wall |
| 23. | Second end wall |
| 24. | Side wall |
| 25. | Roof wall |
| 26. | Plastic sheets |
| 27. | Fastening positions |
| 28. | Inside structural wall |
| 29. | Doors |
| 30. | Hinges |
| 31. | End angle beams |
| 32. | Side angle beams |
| 33. | Wheel fasteners |
| 34. | Upright angle beams |
| 35. | Upright fasteners |
| 36. | End plate |
| 37. | Angle braces |
| 38. | Rod bases |
| 39. | Bar keeper |
| 40. | Wing nut |
| 41. | Slot |
| 42. | Bar riser |

Referring to FIGS. 1–5, a hat-and-uniform caddy 1 has a caddy framework with vertical supports 2 attached to horizontal girders 3 that include horizontal supports 4 with hat-container space for containing items that include uniform hats and boxes 21. At least one hanger rod 5 with uniform-container space is supported horizontally by the vertical supports 2 for containing uniforms 8.

The hat-container space is proportioned to the uniform-container space for sizes of classes of hats and uniforms 8 for containing predetermined ratios of pluralities of the hats, the uniforms 8 and any related items.

Hat retainers are provided on the hat-and-uniform caddy 1 for retaining the hats in place to deter damage and loss during transportation and storage. Uniform retainers are provided on the hat-and-uniform caddy 1 for retaining the uniforms 8 in place to deter damage and loss during transportation and storage.

The vertical supports 2 have base framework 12 for support of the hat-and-uniform caddy 1 on floors of use areas and on transportation vehicles selectively. The base framework 12 has end legs 14, caster wheels that include swivel casters 13 and transit-placement retainers predeterminedly for retaining the hat-and-uniform caddy 1 in place in transit.

The hat-container space includes one or more of the horizontal supports 4 which are full-length shelves that are vertically above the uniform-container space. The uniform-container space includes one or more of the hanger rods 5 which are full-length hanger rods that are extended from-end-to-end of the hat-and-uniform caddy 1 intermediate proximate the vertical supports 2 linearly and the horizontal girders 3 laterally.

The uniform retainers can include notches 6 for containing handles of clothes hangers 7 on which the uniforms 8 can be hung. The notches 6 are articulated for preventing escape of the handles from transportation movement that is transmitted to the hat-and-uniform caddy 1. The articulation of the notches 6 can include notch depth sufficient to retain the handles predeterminedly. Notch-entrance bottlenecks also can be articulated to retain the handles predeterminedly.

Figures 11, 12, 13:
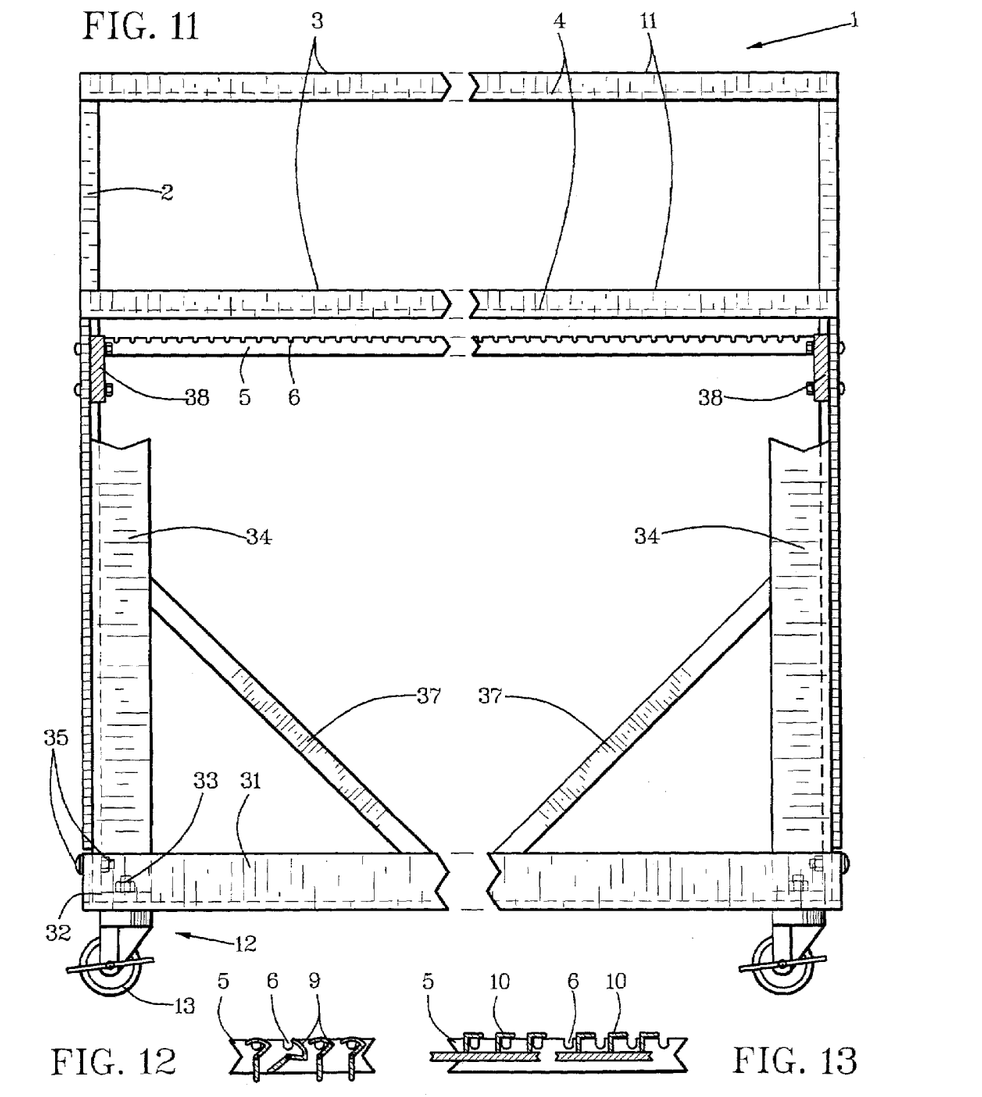
FIG. 11 is a partially cutaway side view of the FIG. 10 illustration.
FIG. 12 is a fragmentary view of the hanger rod with independent notch keepers shown in open and closed modes to deter dislodgment of hangers during foreseeable movement of transportation conditions.
FIG. 13 is a fragmentary view of the hanger rod with multiple notch keepers shown in open and closed modes.

As shown in FIG. 12, the articulation of the notches 6 can include swivel keepers 9 which are attached pivotally to the hanger rod 5 for being swivelled to and from handle-keeper positions with portions of the swivel keepers 9 over entrances to the notches 6.

As shown in FIG. 13, the articulation of the notches 6 can include slide keepers 10 that are slidable horizontally on the hanger rod 5 for being slid to and from handle-keeper positions with portions of the slide keepers 10 over entrances to the notches 6.

As shown in FIGS. 22–26, the articulation of the notches 6 can include a bar keeper 39 that is slidable vertically on the hanger rod 5 for being slid vertically to and from handle-keeper positions with portions of the bar keeper 39 over entrances to the notches 6. The bar keeper 39 can include wing nuts 40 on bolts that extend from the hanger rod 5 through slots 41 in a bar riser 42 for fixing the bar keepers 39 over the notches.

As shown in FIGS. 1–2, 6–7, 11, and 22, the hat retainers can include retainer walls 11 for preventing boxes 21 containing hats and other uniform-related items from being bounced and jarred off of the horizontal supports 4 from transportation movement that is transmitted to the hat-and-uniform caddy 1.

As shown in FIGS. 1, 10–11, and 14–22, the transit-placement retainers can include the end legs 14 with swivel casters 13 with wheels that are rotation lockable as represented figuratively by a cross member for foot actuation on the swivel casters 13.

Figure 6:
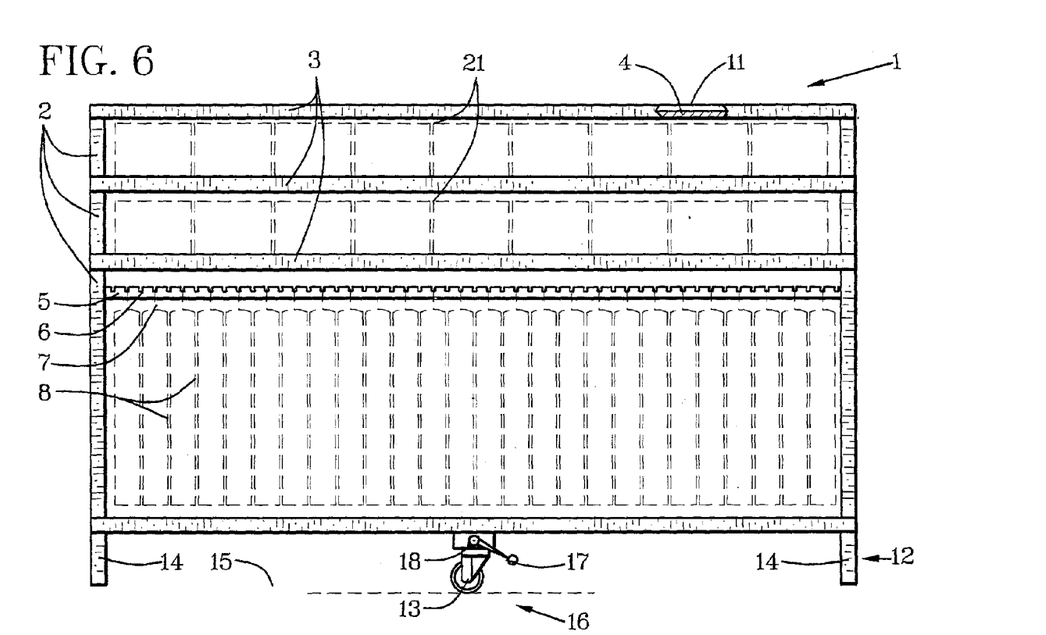
FIG. 6 is a partially cutaway side elevation view of the hat-and-uniform caddy having center wheels at a central position intermediate oppositely disposed end legs that are raised with a jack for the center wheels.
Figure 7:
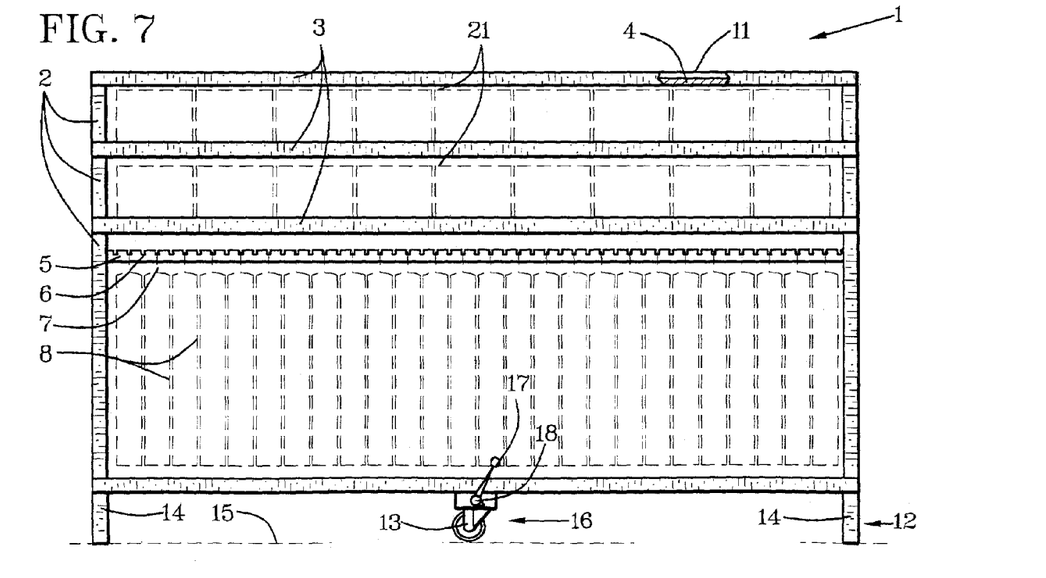
FIG. 7 is the FIG. 6 illustration with the end legs lowered with the jack for resting the end legs on a floor.

As shown in FIGS. 6–7, the transit-placement retainers can include the end legs 14 without wheels in combination with center wheels 16 midway intermediate the ends of the hat-and-uniform caddy 1. The center wheels 16 can be positioned on a jack 17 for raising the end legs 14 off of a floor surface 15 to move the hat-and-uniform caddy 1 on the center wheels 16 and for lowering the end legs 14 to the floor surface 15 for transit-placement mobility of the hat-and-uniform caddy 1 on the center wheels 16. The jack 17 can include an off-centered axle 18 for raising and lowering the center wheels 16.

Figure 1:
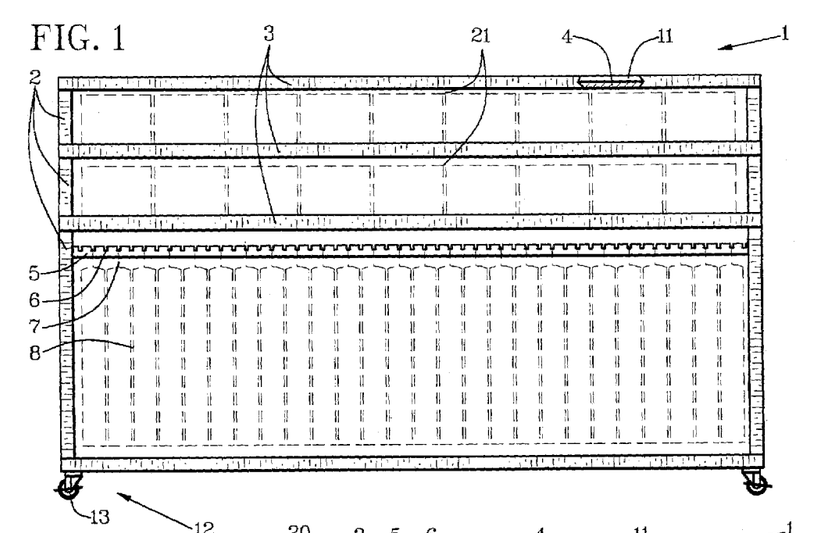
FIG. 1 is a partially cutaway side elevation view of a hat-and-uniform caddy having open sides and containing hats and uniforms in containers for protection.
Figure 2:
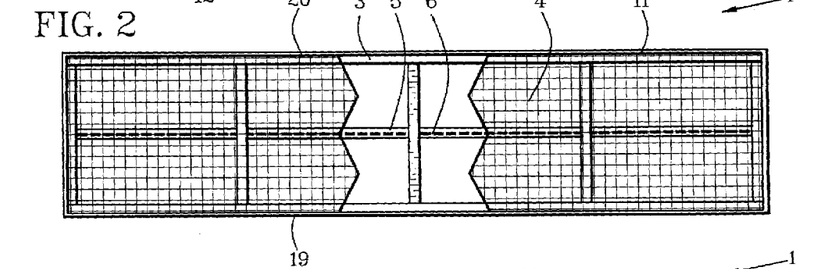
FIG. 2 is a partially cutaway top view of the hat-and-uniform caddy having a single hanger rod.
Figure 3:
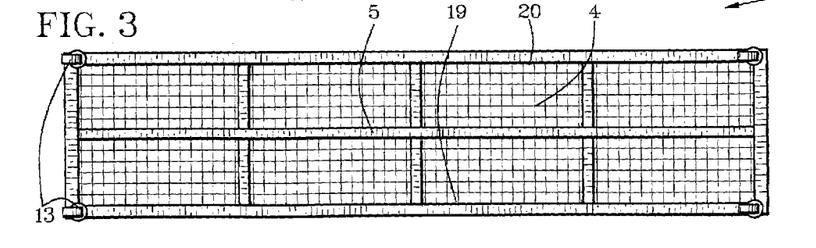
FIG. 3 is a bottom view of the FIG. 2 illustration.
Figure 4:
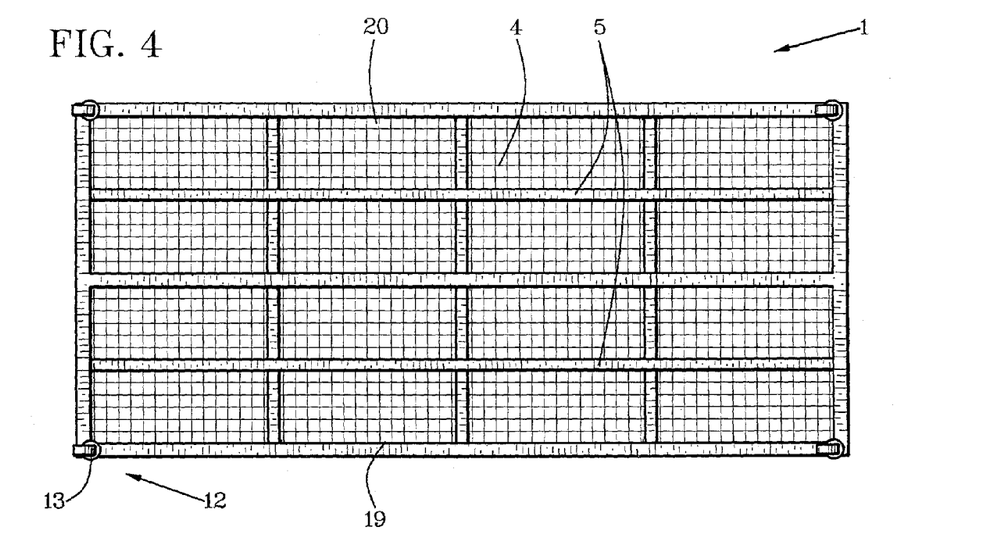
FIG. 4 is a bottom view of the hat-and-uniform caddy having two juxtaposed hanger rods.
Figure 5:
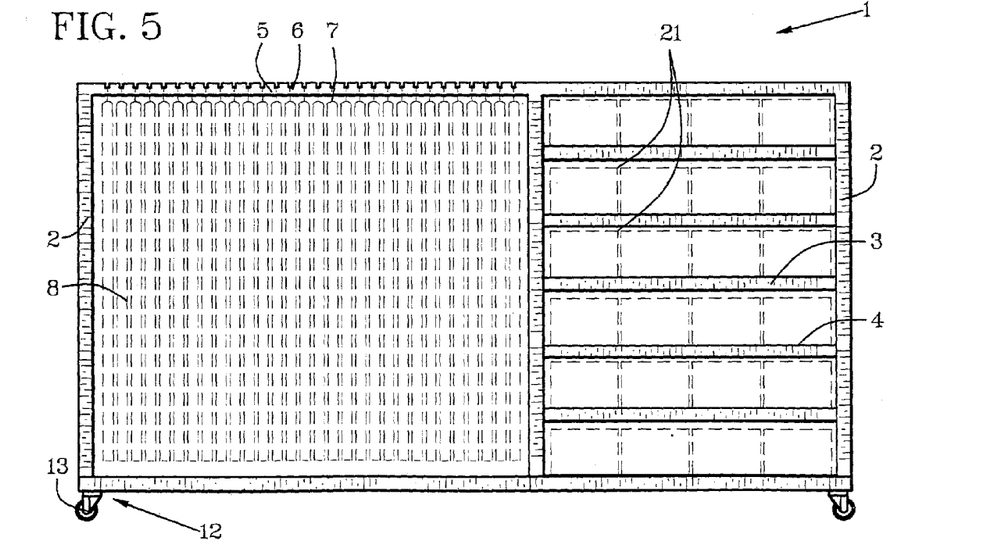
FIG. 5 is a side elevation view of the hat-and-uniform caddy having horizontal supports for containing hats at an end of one or more hanger rods.

As shown in FIG. 5, the hat-container space can include one or more of the horizontal supports 4 which are part-length shelves that are stacked beside the uniform-container space and the uniform-container space can include one or more part-length hanger rods 5 which are extended intermediate an end of the hat-and-uniform caddy 1 and the hat-container space having the horizontal supports 4 which are part-length shelves that are stacked.

Figures 8, 9, 10:
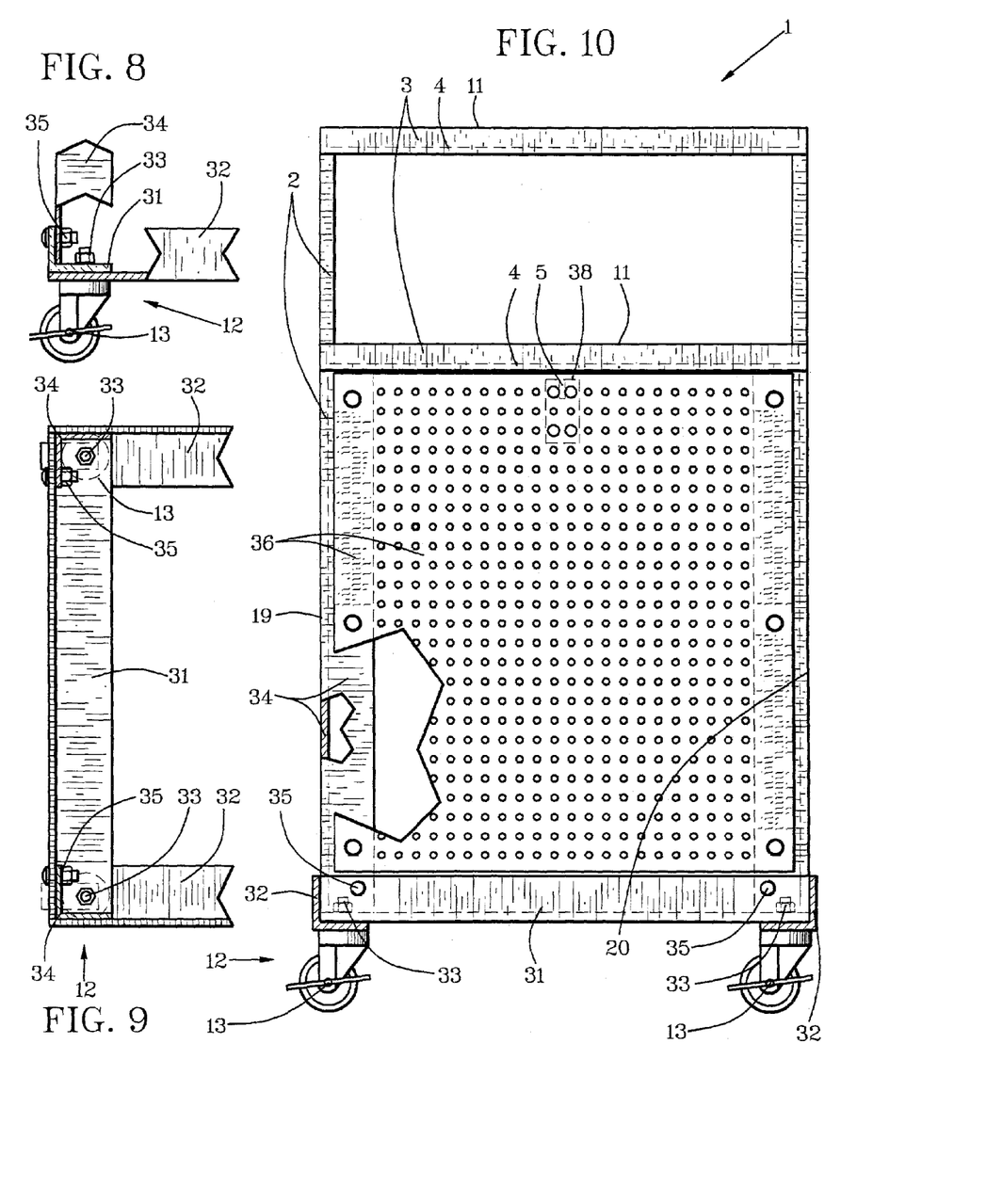
FIG. 8 is a fragmentary cutaway view of a caster wheel attached to a corner of the caddy framework and having angle-beam construction for structural integrity with convenient assembly and disassembly.
FIG. 9 is a fragmentary top view of an end of the caddy framework having the angle-beam construction of the FIG. 8 illustration.
FIG. 10 is a partially cutaway end view of the caddy framework having the angle-beam construction with a perforated plate for a structural wall.

Referring to FIGS. 8–11 and 14–21, the hat-and-uniform caddy 1 can include a first side 19, a second side 20, a first end wall 22, a second end wall 23, a side wall 24 and a roof wall 25. An end plate 36 can be positioned intermediate the first side 19 and the second side 20. The end plate 36 is articulated and fastened to the first side 19 and to the second side 20 for providing angular rigidity intermediate the first side 19 and the second side 20. As shown in FIG. 10, the end plate 36 can include a perforated end plate for receiving hanger handles, hanger hooks and other items.

Figure 14:
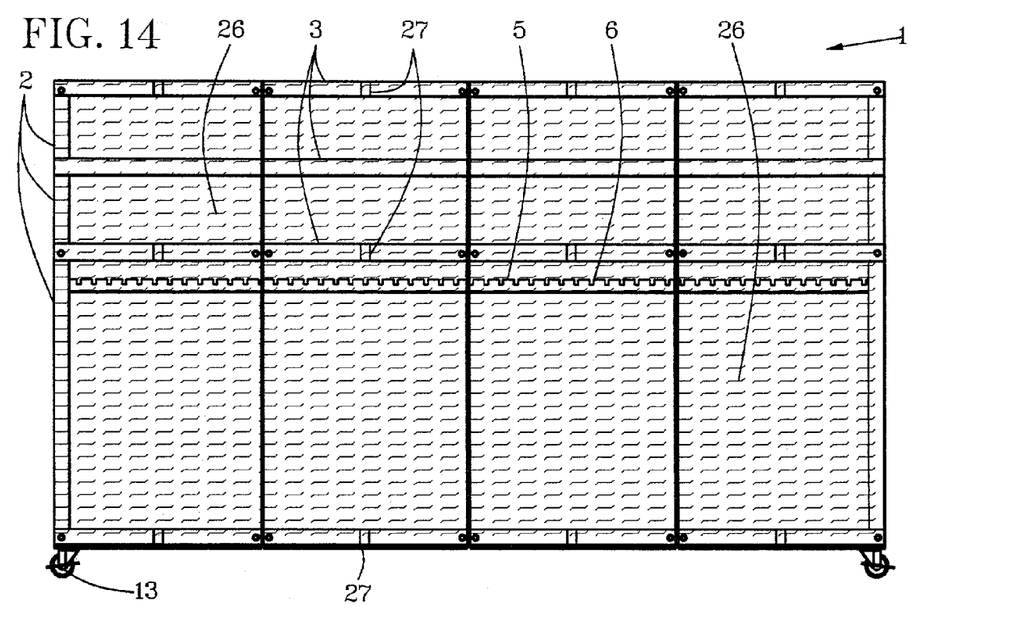
FIG. 14 is a front-side elevation view of the hat-and-uniform caddy with see-through plastic sheeting attached at centers and fasteners at sides of openings to hat sections above hanger sections.
Figure 15:
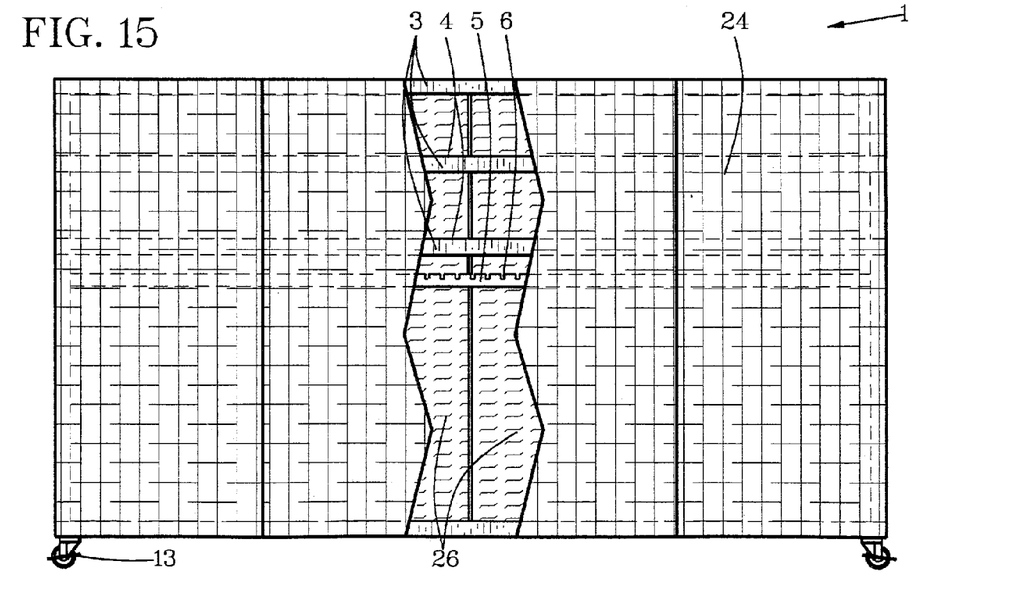
FIG. 15 is a partially cutaway back-side elevation view of the FIG. 14 illustration with a rear structural wall.

As shown in FIGS. 14–15, one or more plastic sheets 26 can be fastened to one or more sides of the hat-and-uniform caddy 1 at fastening positions 27 for being opened and closed selectively.

Figure 16:
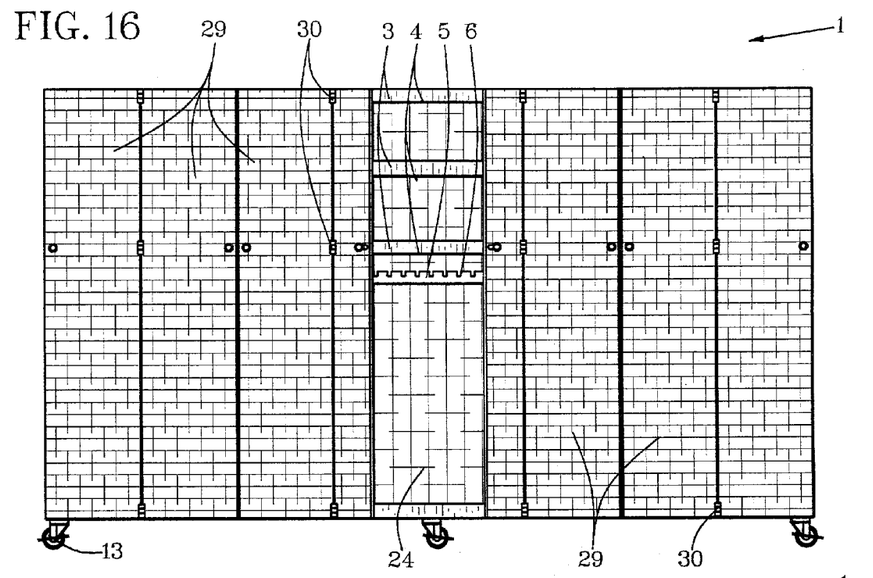
FIG. 16 is a front-side elevation view of the hat-and-uniform caddy with doors hinged to open and close at sides of openings to the hat sections and the hanger sections.
Figure 17:
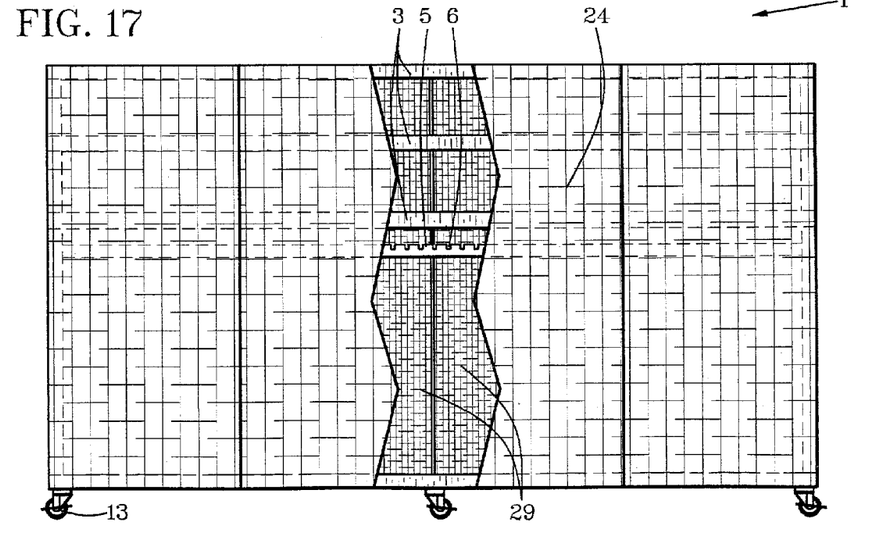
FIG. 17 is a partially cutaway back-side elevation view of the FIG. 16 illustration with the rear structural wall.
Figure 18:
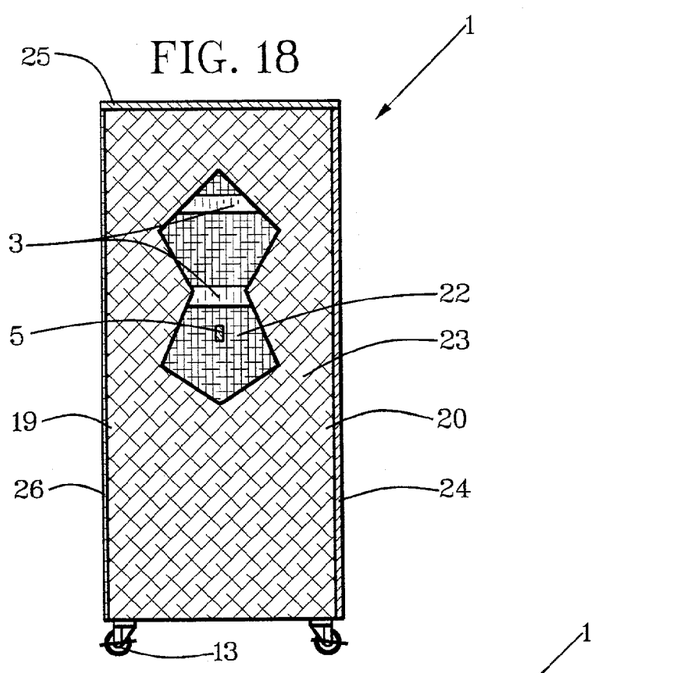
FIG. 18 is a partially cutaway end view of the hat-and-uniform caddy having a single hanger rod, structural ends, a structural back side and a plastic-sheeting front side.
Figure 19:
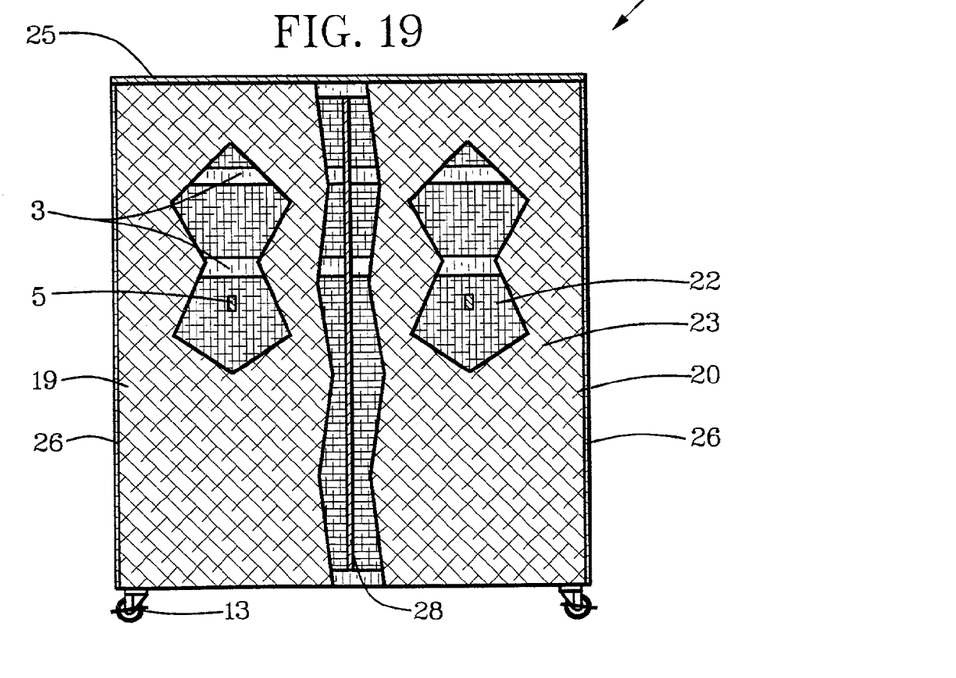
FIG. 19 is a partially cutaway end view of the hat-and-uniform caddy having two juxtaposed hanger rods, structural ends, an inside structural wall, and a plastic-sheet covering on front and back sides.
Figure 20:
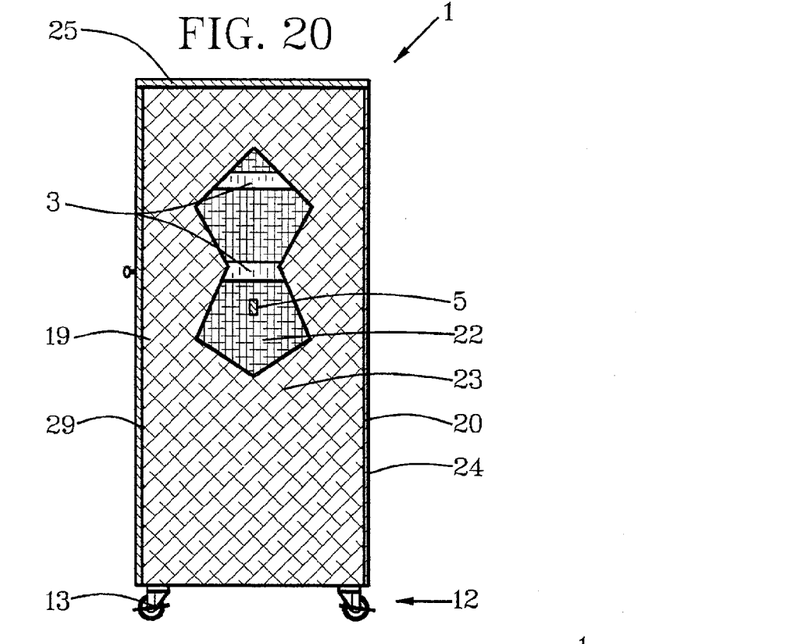
FIG. 20 is a partially cutaway end view of the hat-and-uniform caddy having a single hanger rod, structural ends, a structural back side and doors on a front side.
Figure 21:
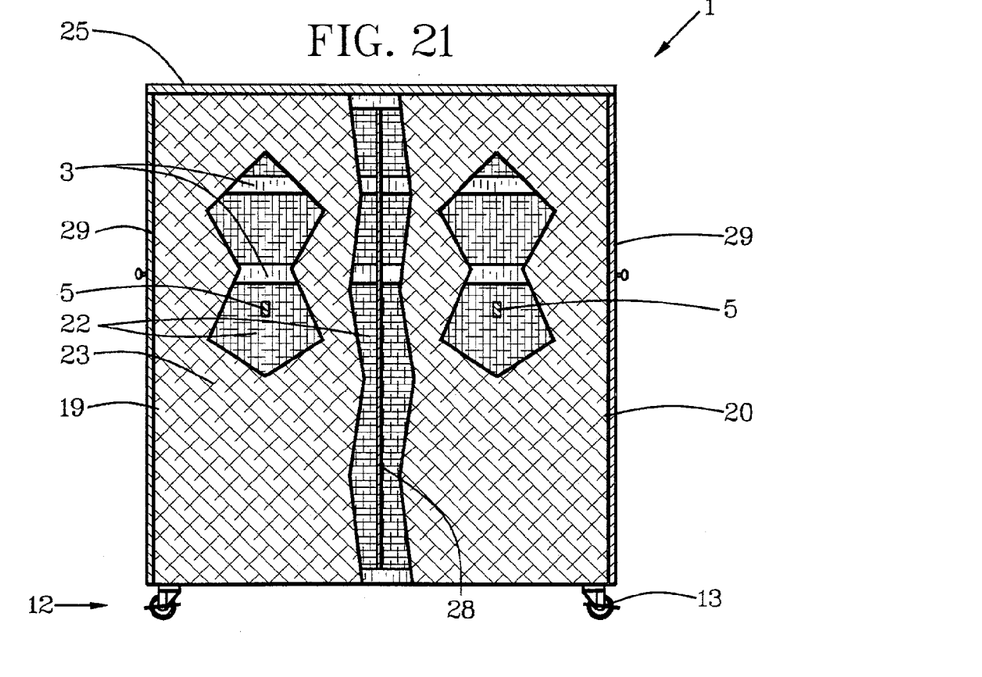
FIG. 21 is a partially cutaway end view of the hat-and-uniform caddy having two juxtaposed hanger rods, structural ends, the inside structural wall, and doors on front and back sides.
Figure 22:
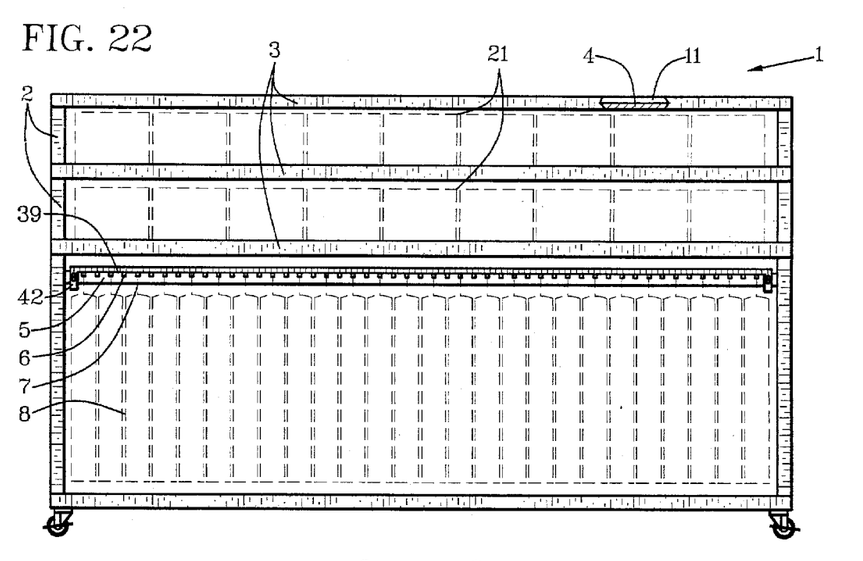
FIG. 22 is a partially cutaway side elevation view of the hat-and-uniform caddy having a hanger rod with a bar keeper for retaining clothes hangers in notches of a hanger rod.
Figure 23:
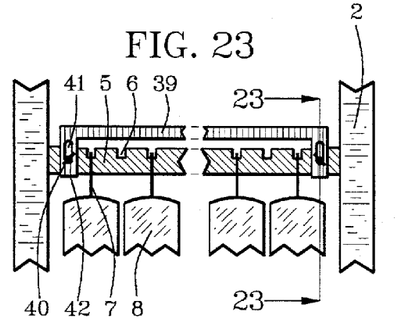
FIG. 23 is an exploded fragmentary and partially cutaway side view of the hanger rod of the FIG. 22 illustration with the bar keeper raised to allow the clothes hangers to be put into the notches.
Figure 24:
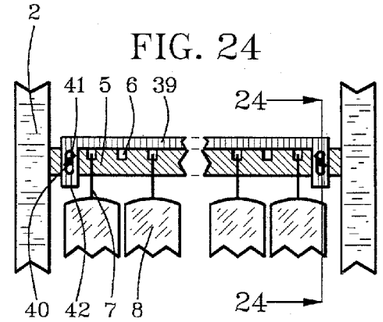
FIG. 24 is the FIG. 23 illustration with the bar keeper lowered to prevent dislodgment of the clothes hangers from the notches.
Figure 25:
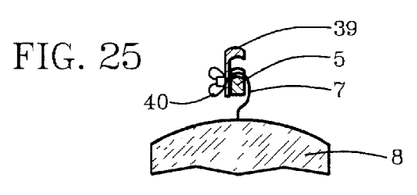
FIG. 25 is a section view through section line 23—23 of FIG. 23.
Figure 26:
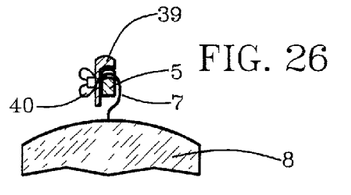
FIG. 26 is a section view through section line 24—24 of FIG. 24.

As shown in FIGS. 16–17, one or more doors 29 can be positioned to be openable and closable predeterminedly, including with use of hinges 30, on one or more sides of the hat-and-uniform caddy 1.

The hat-and-uniform caddy 1 can include a convenience structure for being assembled into a rigid use mode and for being disassembled into a non-use storage mode quickly and conveniently. As shown in FIGS. 8–11, the convenience structure can include end angle beams 31 intermediate side angle beams 32 at bottoms of upright angle beams 34. The upright angle beams 34 can include the vertical supports 2. The end angle beams 31 can be attachable detachably to the side angle beams 32 with a wheel fastener 33 on a swivel caster 13 on each of four caddy-corner intersections of the end angle beams 31 and the side angle beams 32.

The wheel fastener 33 can include a vertical bolt that is colinear to a pivot axis of the swivel caster 13 and extended upward vertically from a swivel base of the swivel caster 13. The vertical bolt is fastened to a horizontal wall of the end angle beam 31 and to a vertical wall of the side angle beam 32 on each of the four caddy-corner intersections. A vertical wall of the end angle beam 31 is fastened to an end angle wall of the upright angle beam 34 with an upright fastener 35. Angle braces 37 are optional.

Referring to FIGS. 10–11 and 18–21, the hanger rod 5 can have opposite ends that are attached to the end plate 36 for being positioned intermediate opposite ends of the hat-and-uniform caddy 1. Attachment of the hanger rod 5 to the end plates 36 can be with rod bases 38.

A new and useful hat-and-uniform caddy having been described, all such foreseeable modifications, adaptations, substitutions of equivalents, mathematical possibilities of combinations of parts, pluralities of parts, applications and forms thereof as described by the following claims and not precluded by prior art are included in this invention.

The invention claimed is:

1. A hat-and-uniform caddy comprising:

a caddy framework having a base framework attached to vertical supports attached to horizontal girders, said horizontal girders include horizontal supports with a hat-container space for containing uniform hats and hat boxes, said base framework having transit-placement mobility with transit-placement retainers for retaining said hat-and-uniform caddy in place on surfaces for transportation and use;

a hanger rod within a uniform-container space supported horizontally by said vertical supports for containing uniforms, said hat-container space being proportioned to said uniform-container space for containing approximately equal pluralities of matching hats, uniforms, and related items;

hat retainers located within said hat-container space for retaining hats in place to deter damage and loss during transportation and storage;

uniform retainers located within said uniform-container space for retaining uniforms in place to deter damage and loss during transportation and storage, said uniform retainers having notches for containing handles of clothes hangers on which uniforms can be hung, said notches having articulation for preventing escape of said handles from transportation movement transmitted to said hat-and-uniform caddy, said articulation of said notches includes a bar keeper on said hanger rod, said bar keeper being slidable vertically on said hanger rod for being slid vertically to and from handle-keeper positions with portions of said bar keepers over entrances to said notches, said bar keeper having wing nuts on bolts extended from said hanger rod through slots in a bar riser for fixing a bar with said bar keepers over said notches.

2. A hat-and-uniform caddy comprising:

a caddy framework having a base framework attached to vertical supports attached to horizontal girders, said horizontal girders include horizontal supports with a hat-container space for containing uniform hats and hat boxes, said base framework having transit-placement mobility with transit-placement retainers for retaining said hat-and-uniform caddy in place on surfaces for transportation and use;

a hanger rod within a uniform-container space supported horizontally by said vertical supports for containing uniforms, said hat-container space being proportioned to said uniform-container space for containing approximately equal pluralities of matching hats, uniforms, and related items;

hat retainers located within said hat-container space for retaining hats in place to deter damage and loss during transportation and storage;

uniform retainers located within said uniform-container space for retaining uniforms in place to deter damage and loss during transportation and storage;

a first side;

a second side;

a first end wall;

a second end wall;

a side wall;

a roof wall; and an end plate intermediate the first side and the second side, the end plate being articulated and fastened to the first side and to the second side for providing angular rigidity intermediate the first side and the second side of the hat-and-uniform caddy.

3. The hat-and-uniform caddy of claim 2 wherein the end plate includes a perforated end plate for receiving hanger handles, hanger hooks and other hanger items.

4. A hat-and-uniform caddy comprising:

a caddy framework having a base framework attached to vertical supports attached to horizontal girders, said horizontal girders include horizontal supports with a hat-container space for containing uniform hats and hat boxes said base framework having transit-placement mobility with transit-placement retainers for retaining said hat-and-uniform caddy in place on surfaces for transportation and use;

a hanger rod within a uniform-container space supported horizontally by said vertical supports for containing uniforms, said hat-container space being proportioned to said uniform-container space for containing approximately equal pluralities of matching hats, uniforms, and related items;

hat retainers located within said hat-container space for retaining hats in place to deter damage and loss during transportation and storage;

uniform retainers located within said uniform-container space for retaining uniforms in place to deter damage and loss during transportation and storage;

an assembly-convenience structure for being assembled into a rigid use mode and for being disassembled into a non-use storage mode, the assembly-convenience structure includes end angle beams intermediate side angle beams at bottoms of upright angle beams, the upright angle beams include the vertical supports, the end angle beams being attachable detachably to the side angle beams with a wheel fastener on a swivel caster on each of four caddy-corner intersections of the end angle beams and the side angle beams, the wheel fastener is colinear to a pivot axis of the swivel caster and extended upward vertically from a swivel base of the swivel caster, the wheel fastener being fastened to a horizontal wall of said end angle beam and to a vertical wall of said side angle beam on each of the four corner sections; and a vertical wall of the end angle beam is fastened to an end angle wall of the upright angle beam with an upright fastener.

5. The hat-and-uniform caddy of claim 4, further comprising:

an end plate, intermediate a first upright angle beam and a second upright angle beam on each of two ends of a hat-and-uniform caddy having full-length shelves; and the end plate being articulated and fastened to the first upright angle beam and to the second upright angle beam on each of the two ends of the hat-and-uniform caddy for enhancing angular rigidity intermediate the first side and the second side of the hat-and-uniform caddy.

6. The and-uniform caddy of claim 5 wherein: the hanger rod has opposite ends that are attached to the end plate for being positioned intermediate opposite ends of the hat-and-uniform caddy.

7. A hat-and-uniform caddy comprising:

a caddy framework having vertical supports that are angle beams attached to horizontal girders that are angle beams;

the horizontal girders including horizontal supports with hat-container space for containing items that include uniform hats and hat boxes;

at least one hanger rod with uniform-container space that is supported horizontally from the vertical supports for containing uniforms;

the hat-container space being proportioned to the uniform-container space for containing approximately equal pluralities of matching hats, uniforms and related items;

the hanger rod having notches with movable covers for retaining handles of clothes hangers on which uniforms can be hung to deter damage from close proximity of the clothes and to deter escape of the handles of the clothes hangers from bouncing, jarring, vehicle movement and other factors related to transportation and use of the hat-and-uniform caddy;

hat-retainer walls located on the horizontal supports for retaining the hats in place to deter damage and loss during transportation and storage;

the vertical supports having base framework for support of the hat-and-uniform caddy on floors of use areas and on transportation vehicles selectively; and the caddy framework being supported by swivel casters with wheels that are rotation lockable for retaining the hat-and-uniform caddy in place for transportation and use.

8. The hat-and-uniform caddy of claim 7 wherein:

the hat-and-uniform caddy includes an assembly-convenience structure for being assembled into a rigid use mode and for being disassembled into a non-use storage mode;

the assembly-convenience structure includes end angle beams intermediate side angle beams at bottoms of upright angle beams;

the upright angle beams include the vertical supports;

the end angle beams are attachable to the side angle beams with a wheel fastener on the swivel caster on each of four caddy-corner intersections of the end angle beams and the side angle beams;

the wheel fastener is colinear to a pivot axis of the swivel caster and extended upward vertically from a swivel base of the swivel caster;

the wheel fastener is fastened to a horizontal wall of the end angle beam and to a vertical wall of the side angle beam on each of the four corner sections; and a vertical wall of the end angle beam is fastened to an end angle wall of the upright angle beam with an upright fastener.

* * * * *

UNITED STATES PATENT AND TRADEMARK OFFICE
CERTIFICATE OF CORRECTION

| | | |
|---|---|---|
| PATENT NO. | : 7,140,501 B2 | Page 1 of 1 |
| APPLICATION NO. | : 10/120594 | |
| DATED | : November 28, 2006 | |
| INVENTOR(S) | : Clayton Shumake | |

It is certified that error appears in the above-identified patent and that said Letters Patent is hereby corrected as shown below:

On the title page, item [76]:
Inventor: "Shumate" should read --Shumake--

Signed and Sealed this

Twenty-third Day of January, 2007

JON W. DUDAS
*Director of the United States Patent and Trademark Office*